S. Corley.
Tailoring.
No. 18958　　　　　Patented Dec. 29, 1857.
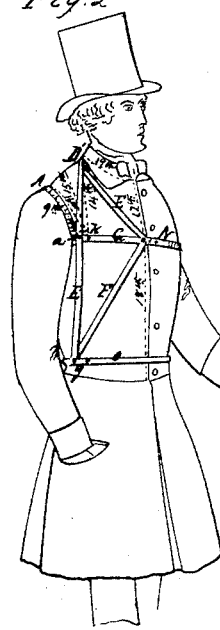
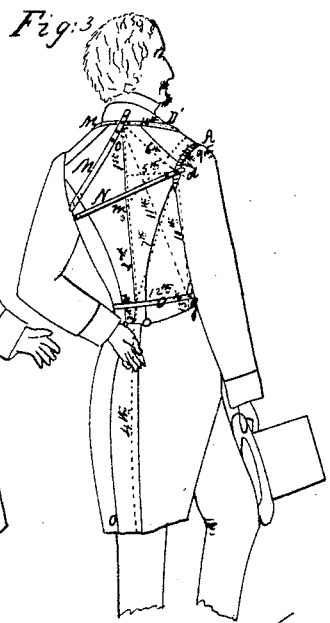
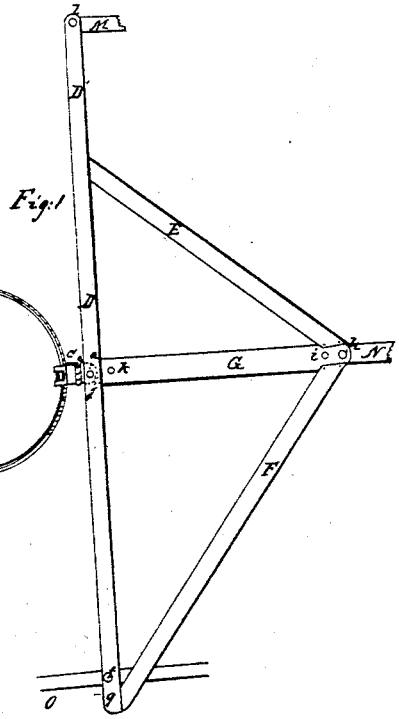
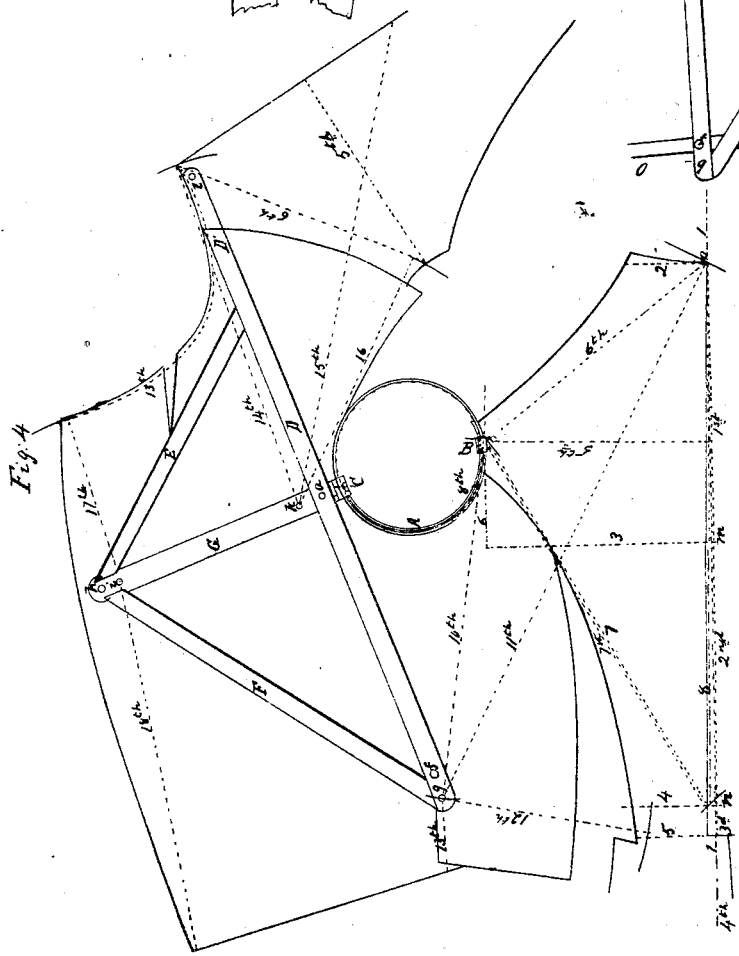

UNITED STATES PATENT OFFICE.

SIMEON CORLEY, OF LEXINGTON, SOUTH CAROLINA.

INSTRUMENT FOR DRAFTING COATS.

Specification of Letters Patent No. 18,958, dated December 29, 1857.

*To all whom it may concern:*

Be it known that I, SIMEON CORLEY, of Lexington, in the District of Lexington and State of South Carolina, have invented a new and useful Instrument for Measuring the Human Body and Drafting Coats or other Garments, which I call the "Indicator" or "Form Transfer;" and I do hereby declare that the following is a full, clear, and exact description of the same, reference being had to the accompanying drawings, making a part of this specification, in which—

Figure I, is a perspective view of the principal portions of the instrument. Figs. II and III are back and front views illustrating its application to the measure of the body. Fig. IV illustrates the method of drafting a coat from the measurements taken by the instrument.

Similar letters of reference indicate the same parts in all the figures.

The instrument consists of two principal parts, the first of which is a hoop or band A, of thin steel or other metal plate, the object of which is to obtain the exact measurement of what is known to tailors as the scye, and to apply the same to the cloth. This hoop is so constructed that its circumference can be contracted or enlarged at pleasure, and it is provided with a slide B, fitted with a set screw $b$, which serves to secure it at any circumference, such circumference in inches and convenient fractional parts thereof being indicated on the exterior of the hoop, which is graduated in those measures. The hoop is also furnished with another slide C, to which a pivot $a$, is attached by a hinge $c$; the said slide C being movable to any position on the hoop that the shape or size of the customer may require, as will be hereinafter explained. The slide B, before mentioned, has a pivot $d$, rigidly attached to it.

The other principal part of the instrument consists of a triangle D, E, F, of thin steel plate or other material in which sufficient strength and flexibility are combined, with an extending arm D′, forming a continuation of the longest side D. The side D and arm D′, combined should be of a length sufficient to extend from the waist upward in front of the shoulder and over said shoulder as far as the middle of the back of any customer. The sides E, and F, form respectively angles of about 50°, and 40° to the side D. A piece G, perpendicular to the side D, and meeting the angle E, F, is added to strengthen the triangle, and also to keep the angle E, F, at the same distance from side D, when drawn over the round surface of the human body, as when laid flat on the cloth, in transferring the measures to the same, in drafting. At the bottom of the side D, and its junction with F, is situated a hole $f$, and pivot $g$; at the junction of E, F, G, are a hole $h$, and pivot $i$; at the junction of D, G, are a hole $j$, and pivot $k$, and at the top of the arm D, there is a hole $l$. The pivots $g$, $i$, $k$, are made to project from both sides of the instrument for the purpose of making the same instrument applicable to either side of the body, as taste or circumstances may dictate.

M, N, O, are three straps which are furnished each with a stud at one end to hook into one of the holes $f$, $h$, $j$, and for some distance from its other end, each is perforated at intervals of about half an inch. These straps serve to attach the instrument to the body.

A tape measure having a hole at one end, to hook into either of the pivots $g$, $i$, $k$, completes the instrument.

Before taking a measurement for a coat with this instrument, the intended height of the neck seam at the center of the back should be marked on the customer, as shown at $o$, Fig. III, and a mark should be made on the back seam or center of the back, opposite or between the two most prominent points of the blade bones, as shown at $m$, Fig. III, and the natural length of the waist should be marked on the back seam or in the center of the back, as shown at $n$, Fig. III. These preparations having been made, extend the hoop A, and slip it over either hand and arm until it encircles the scye as close to the body as possible, and just where the scye seam should come, after which contract it until it fits closely but comfortably, taking care to bring the pivot $d$, opposite the middle of the place where what is termed the back scye ought to be; then by turning the set screw $b$, in the slide B, the hoop will be fixed at the right side and caused to hold itself firmly in its position. I will suppose for the sake of example, the instrument to be applied at the right side. Next place the triangle with its hole $j$, on the pivot $a$, of the slide C, as shown in Fig. II, and bring the arm D′, of the triangle against the collar seam or where the collar seam ought to be, and draw it up, moving the slide C, as much as necessary until the side E, is near the collar seam in front, and while in that position attach the strap M, by its stud to the hole *l*, in the arm D′, and lead said strap down and under the left shoulder back to the same place, attaching it by one of its holes to its stud, as shown in Fig. III. Then turn up the lapel of the coat, and pressing the triangle down flat against the center of the breast and draw the strap N, (which is attached by its stud to the hole *h*,) under the left arm rather tightly, and attach it by one of its holes to the pivot *d*, on the slide B. Then pressing the triangle closely downward and backward, draw the strap O, (which is attached by its stud to the hole *f*,) tightly backward around the waist and forward to the same point, where attach it by one of its holes to its own stud. Now see that the triangle fits close to the body, in all its parts, and if it does not, then tighten the straps or either of them till it does so. The instrument being thus adjusted, take the 1st, 2nd, 3rd, and 4th measures as indicated in Fig. III, in red dotted lines and there numbered, viz., the 1st from the point *o*, Fig. III, to the point *m*, before mentioned; the 2nd from *m*, to *n*; the 3rd from *n*, to the intended position of the waist of the garment, and the 4th for the length of skirt. Then attach the tape-measure by its hole to the pivot *d*, as shown in Fig. III, and from the said pivot take the 5th, 6th, and 7th measures marked in that figure, viz., the 5th straight across to the back seam or center of the back; the 6th to the point *o*; and the 7th to the point *n*. Note the scye-measure as determined by the circumference of the hoop A, and the number of inches from the pivot *d*, to the slide C, which are the 8th and 9th measures. Next remove the tape measure to the pivot *g*, as shown in both Figs. II and III, and from thence take the 10th 11th 12th and 13th measures, as indicated in those figures, viz. the 10th to the pivot *d*; the 11th to the point *o*; the 12th to the point *n*, and the 13th to the natural waist. Then remove the tape-measure to the pivot *k*, and from thence take the 14th, 15th, and 16th measures, viz., the 14th over the right shoulder to the point *o*, the 15th over the same shoulder to the point *m*, and the 16th over the same shoulder to the pivot *d*. Afterward remove the tape to the pivot *i*, and from thence take the 17th and 18th measures, viz., the 17th as indicated in Fig. II, upward to the front of the neck seam or throttle and the 18th downward to the intended line of the waist seam. Then take the 19th measure, viz., from the point *o*, to the throttle, and take the breast and waist measures in the usual manner,—which completes the measurement.

To draft from the above measurements, draw upon the cloth a straight line 1 and then draw a short line 2, square or nearly so with 1, as shown in Fig. IV, in which all the measurements are indicated in red dotted lines. Mark out on line 1, commencing at its junction with 2, the 1st, 2nd, 3rd, and 4th measures. Erect at the terminal points of these measures, upon the line 1, the perpendiculars 3, 4, and 5; and measure out on line 3,—which starts from point *m*, corresponding with *m*, in Fig. III,—the 5th measure, and square the line 6, from said line 3. Then place the end of the tape at the point of junction of lines 1 and 2, which correspond with *o*, Fig. III, and take the 6th measure to line 6, and mark the point of intersection, and from thence take the 7th measure to the waist, and draw the line 7. Next draw the line 8, from a point in the line 1, opposite the point of intersection of the 5th and 6th measures on the line 6, to the terminus of the 7th measure where the natural length of the waist is indicated; and mark out and cut the back to any shape that fancy or fashion may dictate. The outline of the back is shown in Fig. IV, in blue outline. Next lay the "Indicator" or "Form transfer" on any part of the cloth from which the front part of the garment can be cut to any advantage as shown in the figure, and apply the 8th measure by marking around the inside of the hoop A, and afterward apply the 10th measure to establish the proper position of the triangle, relatively to the hoop, and then mark around the triangle, that its exact position may not be lost in the event of its being accidentally moved. Then lay off the 11th 12th and 13th measures, from the pivot *g*, describing a short arc at the end of each as represented in red color. Afterward lay off the 14th 15th and 16th measures from the pivot *k*, and the 17th and 18th measures from the pivot *i*. Next take the back that has been cut, and place the intersecting lines of the 5th 6th and 7th measures on the back to the pivot *d*, as shown in the lower part of Fig. IV, and bring the back in the position relatively to the front, in which the measures were taken, that is to say, the top of the back to the arc of the measure 11, and mark the upper part of the side seam on the front from the back. Afterward place the hand on the line 3, where it crosses at the side seam, and draw the middle of the back, at the waist, up to the arc described by the 12th measure, and then form the remainder of the side seam from the back. Now remove the back and place it as represented in the upper part of the figure, bringing the point *o*, to the arc described by the 14th measurement, and the terminal point of the 5th and 6th measurements to the arc described by the 16th measurement and the point $m$, to the arc described by the 15th measurement, letting the top of the back or neck rest on the line indicated by the edge of the arm D', of the instrument. While the back is in this position, mark from it the shoulder seam, the neck gorge, and the scye. Then apply the 19th measure to mark the throttle, and the breast and waist measures, adding to the breast any surplus for lapel as fashion may demand. Form the bottom of the forepart to the measures 13 and 18, and give the spring to the seam under the arm as the 13th measure may show.

The advantages obtained by the use of this instrument may be set forth as follows: 1st, getting the exact size of the scye at the right place by keeping the hoop A, close against the body during the time of taking the measurement. 2nd, by placing the arm D, of the triangle against the next seam, and drawing all sides of the triangle closely against the breast, as directed, a base line is unerringly established from neck to waist; thus bringing the pivot $g$, at the waist backward or forward on the side of the customer, as his shape may need; the measures from said pivot $g$, establishing correctly the relative positions of all the other points of the garment. 3rd, the relative positions of all the points in coat-drafting are established, and every part of the garment is enabled to be delineated accurately in its relation to every other part, without which no garment can fit.

I do not claim the invention of any of the measurements obtained by my instrument. Nor do I claim, separately considered, the employment of a hoop or ring for obtaining measurements and applying the same to the cloth. But

What I claim as my invention, and desire to secure by Letters-Patent is:—

The triangle D, E, F, having an arm D', combined with the hoop or ring A, substantially as herein described, for the purposes set forth.

SIMEON CORLEY.

Witnesses:
L. BOOZER,
JOHN FOX.